(12) United States Patent
Kawakami et al.

(10) Patent No.: US 10,232,601 B2
(45) Date of Patent: Mar. 19, 2019

(54) DECORATION METHOD OF PRINTED MATTER AND PRINTED MATTER

(71) Applicant: Japan Card Products Co., Ltd., Saitama (JP)

(72) Inventors: Yoshiyuki Kawakami, Saitama (JP); Tomoki Tsunoda, Saitama (JP)

(73) Assignee: Japan Card Products Co., Ltd., Saitama (JP)

( * ) Notice: Subject to any disclaimer, the term of this patent is extended or adjusted under 35 U.S.C. 154(b) by 57 days.

(21) Appl. No.: 15/455,193

(22) Filed: Mar. 10, 2017

(65) Prior Publication Data

US 2017/0259551 A1   Sep. 14, 2017

(30) Foreign Application Priority Data

Mar. 11, 2016   (JP) .................................. 2016-48705

(51) Int. Cl.
| | |
|---|---|
| *B32B 3/00* | (2006.01) |
| *B32B 38/00* | (2006.01) |
| *B32B 7/12* | (2006.01) |
| *B32B 15/04* | (2006.01) |
| *B41F 19/00* | (2006.01) |
| *B44C 1/24* | (2006.01) |
| *B44F 1/04* | (2006.01) |
| *B44F 7/00* | (2006.01) |
| *B32B 15/12* | (2006.01) |
| *B44C 1/14* | (2006.01) |
| *B32B 37/12* | (2006.01) |
| *B32B 38/10* | (2006.01) |
| *B44C 1/17* | (2006.01) |

(52) U.S. Cl.
CPC .............. *B32B 38/145* (2013.01); *B32B 7/12* (2013.01); *B32B 15/04* (2013.01); *B32B 15/12* (2013.01); *B41F 19/001* (2013.01); *B44C 1/14* (2013.01); *B44C 1/24* (2013.01); *B44F 1/045* (2013.01); *B44F 7/00* (2013.01); *B32B 37/12* (2013.01); *B32B 38/10* (2013.01); *B32B 2250/02* (2013.01); *B32B 2255/12* (2013.01); *B32B 2255/26* (2013.01); *B32B 2255/28* (2013.01); *B32B 2307/40* (2013.01); *B32B 2307/406* (2013.01); *B32B 2307/412* (2013.01); *B32B 2425/00* (2013.01); *B32B 2451/00* (2013.01); *B44C 1/1733* (2013.01)

(58) Field of Classification Search
CPC ......... B32B 7/12; B32B 38/145; B32B 15/04; B32B 2255/12; B44C 1/14; B44C 1/24
See application file for complete search history.

(56) References Cited

U.S. PATENT DOCUMENTS 4,484,970 A * 11/1984 Burzlaff ................. B44C 1/105
156/233

FOREIGN PATENT DOCUMENTS

JP          5747569 B2      7/2015

* cited by examiner

*Primary Examiner* — Elizabeth E Mulvaney
(74) *Attorney, Agent, or Firm* — Nakanishi IP Associates, LLC

(57) ABSTRACT

A decoration method of a printed matter includes: forming a printed layer on a surface of a sheet or of a mounting paper with a transparent varnish, printing a predetermined pattern on the surface of the printed layer by an ink or by a resin which are capable of being adhered to the printed layer; and pressing a metal foil onto the pattern printed by the ink or the resin with an adhesive agent. The adhesive agent does not adhere to the printed layer but adheres to the pattern. As a result, the metal foil 6 is printed only to the pattern.

6 Claims, 4 Drawing Sheets

A
B

DECORATION METHOD OF PRINTED MATTER AND PRINTED MATTER

CROSS-REFERENCE TO RELATED APPLICATION

The present application is based on and claims priority to Japanese patent application No. JP 2016-048705, filed on Mar. 11, 2016, the disclosure of which is hereby incorporated by reference herein in its entirety.

BACKGROUND

Technical Field

The disclosure relates to a decoration method of a printed matter and a printed matter.

Description of Related Art

Trading cards highly decorated by printing are known. Such trading cards have a size which a user can hold them by a hand. As an example, Patent Literature 1 (JP 5,747,569 B; hereinafter referred to as "PL1") teaches a card printed to obtain a high decorative effect. The card of PL1 includes a reflection layer formed with, for example, a metal foil on a base material (i.e., a mounting paper) and a translucent-pattern layer having a pattern formed by a translucent resin or a translucent film on the reflection layer. By providing the translucent-pattern layer on the reflection layer, it becomes possible to create a highly decorated card which is able to provide an image with a three-dimensional appearance.

Further, a decoration method of a printed matter that attaches a metal foil on the printed matter is also known. One example of the method is called a hot stamp. This method includes: forming a convex pattern in accordance with a design to be made with the metal foil, applying heat to the convex pattern, and pressing the heated convex pattern onto the metal foil to transfer to a paper. Another example of the method is called a cold stamp or a cold foil. This method includes: applying an adhesive agent on a paper in accordance with the design to be made by the metal foil, and attaching the metal foil on the paper to achieve the design.

SUMMARY

The trading cards are often used for a card game. Additionally, some people are tendered to buy and collect some of the trading cards. That is, these trading cards have an additional value that attracts and satisfies those people to collect them. To obtain such an additional value, the conventional trading cards give the image a three-dimensional appearance by refracting the reflection light from the metal foil with the translucent pattern layer. Alternatively, to form a card with a high additional value, a method to give a printed pattern a three-dimensional appearance and/or a method to decorate the pattern more densely may be applied.

For the cards having an additional value, it may be necessary to decorate the cards with a metal foil. However, it is difficult to properly transfer the metal foil onto the paper with the hot stamp when the minute convex shapes are to be formed to achieve a precise design. Further, as the design is formed by pressing the convex patterns, a part of the metal foil gets concaved deficiently. With the cold stamp, on the other hand, it is possible to form a relatively complicated design. However, the outlines of the design may become ambiguous and the metal foil may lose its glossiness.

An object of this disclosure is, therefore, to provide a decoration method of a printed matter or to provide a printed matter such that the three-dimensional pattern area formed on the surface of the printed matter is recognizable in both its appearance and feeling and the irregular shapes thereof are densely and neatly achieved on the printed matter.

To achieve the above object, an aspect of this disclosure provides a decoration method of a printed matter. The method includes: forming a coated film by applying transparent varnish on a surface of a sheet or on a surface of a mounting paper, the sheet or the mounting paper comprising the printed matter; printing a predetermined pattern on the surface of the coated film by an ink or by a resin which are capable of being adhered to the coated film; pressing a metal foil onto the pattern printed by the ink or the resin with an adhesive agent, the adhesive agent having a property in which the adhesive agent does not adhere to the coated film but adheres to the pattern printed by the ink or the resin; and adhering the metal foil only to the pattern printed by the ink or the resin.

Further, another aspect of the disclosure provides a printed matter. The printed matter includes a sheet or a amounting paper, a coated film of a transparent varnish that is provided on a surface of the sheet or of the mounting paper, a pattern that is formed by an ink or by a resin which are capable of being adhered to the coated film, and a metal foil that is provided only on a surface of the pattern using an adhesive agent, the adhesive agent having a property in which the adhesive agent does not adhere to the coated film but adheres to the pattern formed by the ink or the resin.

DETAILED DESCRIPTION

Hereinafter, embodiments according to this disclosure will be described with reference to the accompanied drawings.

Embodiment 1

Figure 1:
FIG. 1 is a view of a card formed by a decoration method according to an embodiment of this disclosure.
Figure 2:
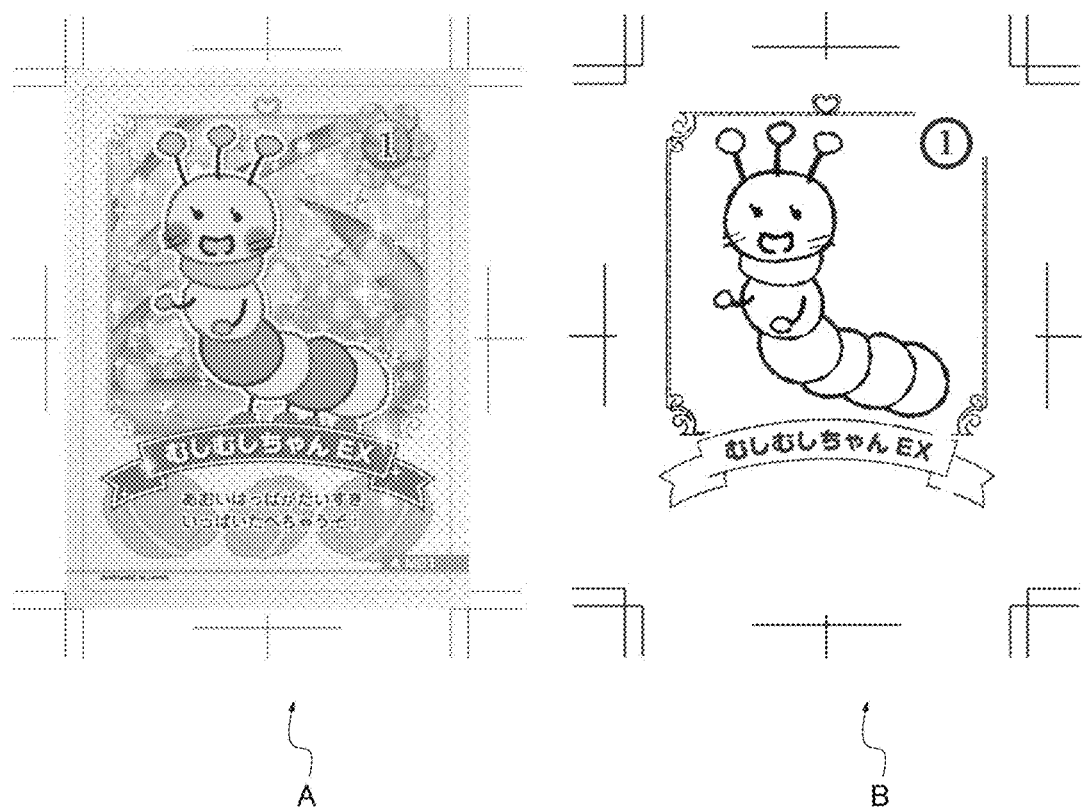
FIG. 2 is an explanation view showing printing plates designed for forming a printing layer disposed on a surface of the card and a decoration layer disposed on the printing layer.

FIG. 1 is a view showing a printing surface of a card 1 formed in accordance with a decoration method of this disclosure. The card 1 is obtained by printing (imposing) a plurality of patterns on a large paper and by cutting the large paper to form the substantially rectangular shape for each printed pattern. FIG. 2 shows a printing plate A and a printing plate B. The printing plate A is used to form a pattern (a printed layer 3) on the surface of the card 1. The printing plate B is used to form a decoration layer (i.e., a convex layer 5 and a metal foil 6) on the printed layer 3.

With the printing plate B and the later-explained steps, it is possible to obtain a printed matter which has a unique decorative effect.

Figure 3:
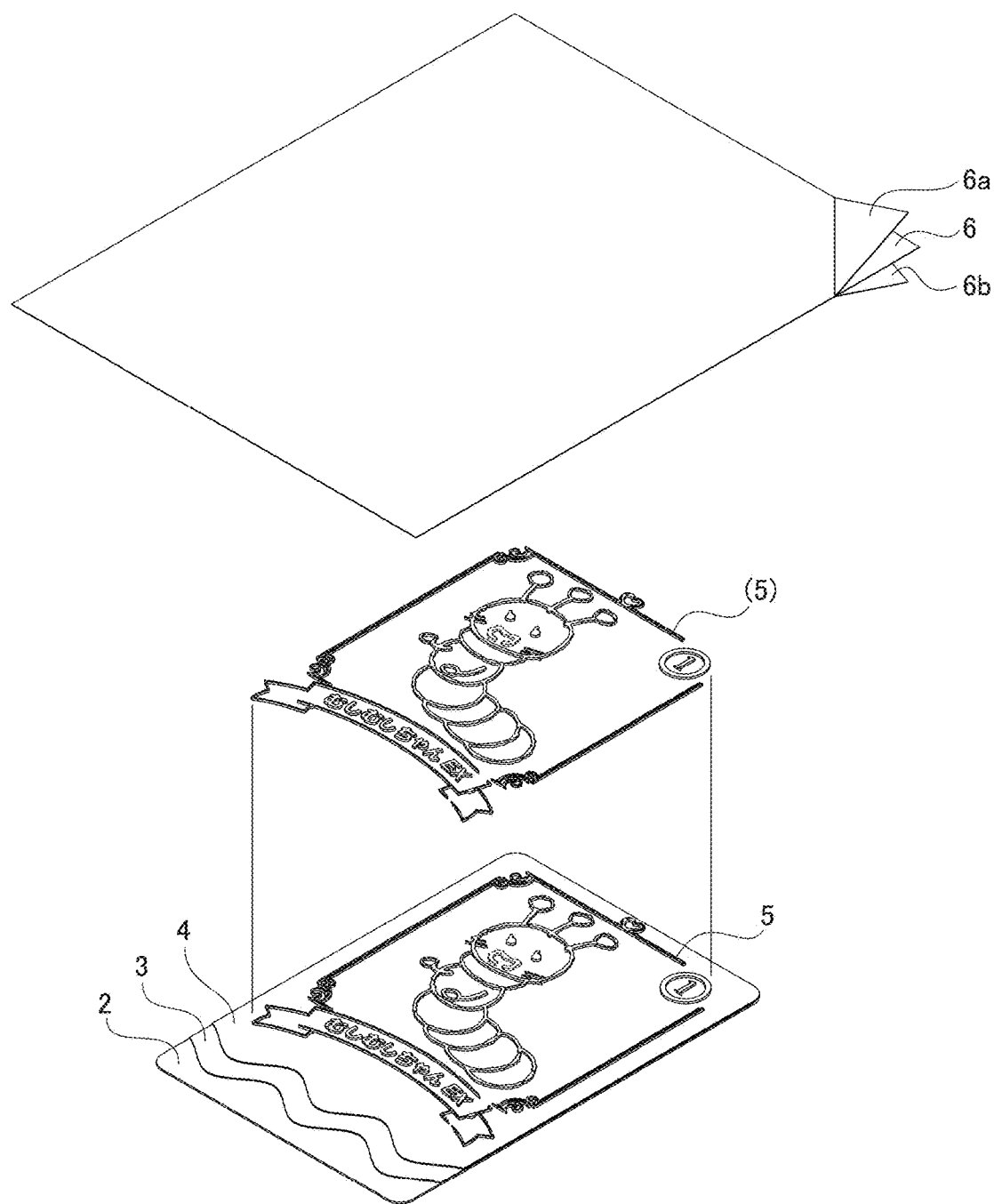
FIG. 3 is an explanation view for explaining a decoration method according to the embodiment of this disclosure.

The decoration method of a printed matter and the configuration of the printed matter achieved by the printing plate A and printing plate B will be described with reference to FIG. 3. Although FIG. 3 shows only one card 1, a plurality of cards 1 can successfully be manufactured in a short time period by printing a plurality of patterns on a large sheet, as described above.

First, the pattern illustrated in the printing plate A is printed on a mounting paper 2 by a printing machine. At this step, the mounting paper 2 is a large sheet and has not been cut into the plurality of rectangular shapes. Accordingly, the printed layer 3 is formed. The printing machine used here is a four-color offset-printing machine. The printing plate A represents data which is executed by the offset-printing machine and has four or more colors, such as Cyan C, Magenta M, Yellow Y, and Black K.

Depending on the printed pattern, a laminating processing to laminate a hologram sheet may be executed before or after the offset-printing processing with the printing plate A. The hologram sheet diffusively reflects incident light so as to show a pattern and/or a design. Additionally, a cold stamp method (i.e., a decoration processing) may be applied to provide a coated film on the surface of the hologram sheet with another metal foil. Such a decoration processing can be applied successively after a printing processing of the pattern with the printing plate A by using, for example, a coater connected to the offset-printing machine.

With the above step, i.e., by executing the printing processing on the mounting paper 2 with the printing plate A by the offset-printing machine, a full-colored printed layer 3 is formed on the mounting paper 2. That is, a printed matter used as a basis for the next decoration processing is obtained.

After forming the printed layer 3, a coated film (a peeling layer 4) of peeling varnish is formed on the entire surface including the printed layer 3 by using a screen printing machine or the coater. The varnish is a "2000 medium" produced by TEIKOKU Printing Inks Mfg. Co., Ltd. The "2000 medium" includes nitrocellulose and solvent naphtha (petroleum), light arom. with predetermined ratios, as the component thereof. For example, the varnish of this embodiment includes about 20% of nitrocellulose as a resin component and about 1% of solvent naphtha as a solvent. The coated film formed by this peeling varnish is a transparent resin film formed on the printed surface and has a function to peel the adhesive agent for the metal foil 6. Further, the coated film functions as a protective layer for the area exposing the printed layer 3. Hereinafter, the coated film is also referred to as the peeling layer 4.

After forming the peeling layer 4, the pattern as the convex layer 5 is printed under a silk-screen print. In the silk-screen print, the pattern (i.e., the convex layer 5) is formed by an ink having a high adhesiveness against the peeling layer 4 while using the printing plate B. Although the peeling layer 4 generally has a property of repelling ink, it is possible to print the pattern (i.e., the convex layer 5) on the peeling layer 4 by using the ink which does not contain silicon. In other words, it is possible to firmly provide the convex layer 5 with the ink having no silicon. Note that the convex layer 5 may be or may not be colored depending on the pattern or the design of the print. In this embodiment, the ink is transparent. Alternatively, the convex layer 5 may be formed by printing a resin or a coated film so long as it has a similar function.

In the silk-screen print, the ink is applied through a transmitting part provided on a screen (gauze). That is, the ink does not have fluidity, thereby forming a thick pattern compared to that of the offset-printing. That is, the pattern formed by the ink has a thickness which is easily recognized by view. Further, the thickness of the pattern is adjustable based on the viscosity of the ink and the roughness of the screen (gauze). In this embodiment, the convex layer 5 is formed on the peeling layer 4 by the above-described silk-screen print. Depending on the desired design, the convex layer 5 may be formed as a convex area having fine convex parts made of a dot, a line, a plane, and the like.

After the above steps, the metal foil 6 is pressed on the surface of the mounting paper 2 including the peeling layer 4 and the convex layer 5. The metal foil 6 of this embodiment is "MSV type Vapor-Depositing foil" produced by Murata Kinpaku Co., Ltd. As shown in FIG. 3, the metal foil 6 is formed by vapor-depositing an aluminum film on a thin film 6a and by slightly coating the surface of the aluminum film with an adhesive layer 6b to form an adhesive face. The thin film 6a is formed of a flexible material such as a PET material. The adhesive agent applied on the metal foil 6 has a property in which the agent does not adhere to the "2000 medium" forming the peeling layer 4 while the agent adheres to the convex layer 5 provided on the peeling layer 4. That is, the adhesive agent has different adhesive strengths depending on the materials to be adhered.

The thin film 6a having the metal foil 6 is applied onto the surface of the mounting paper 2 having the peeling layer 4 and the convex layer 5 and is pressed by, for example, a roller. The thin film 6a is then removed from the mounting paper 2 such that the metal foil 6 is adhered only to the convex layer 5. As described above, the metal foil 6 does not adhere to the peeling layer 4. Therefore, the printed layer 3 provided below the peeling layer 4 remains visible. Accordingly, by providing a layer of the metal foil 6 in accordance with the pattern formed as the convex layer 5, a gloss pattern is obtained as a decoration part to decorate the printed layer 3.

As described above, the convex layer 5 is formed by the silk-screen print. The silk-screen print is able to print several lines within 1 mm of width by using a fine screen (gauze). In general, a 200 mesh screen has 200 holes/inch, and a 350 mesh screen has 350 holes/inch. The definition of the screen or mesh is appropriately and selectably set in accordance with the desired definition and/or the stereoscopic degree (i.e., the thickness of the coated film) of the convex layer 5 to be made. By forming the convex layer 5 by the silk-screen print, it becomes possible to form the pattern of the metal foil 6 with a desired definition. Since the surface of the convex layer 5 is pressed by the metal foil 6 with a higher pressure than the other parts, the outline of the pattern becomes clearer with the metal foil 6.

Embodiment 2

Figure 4:
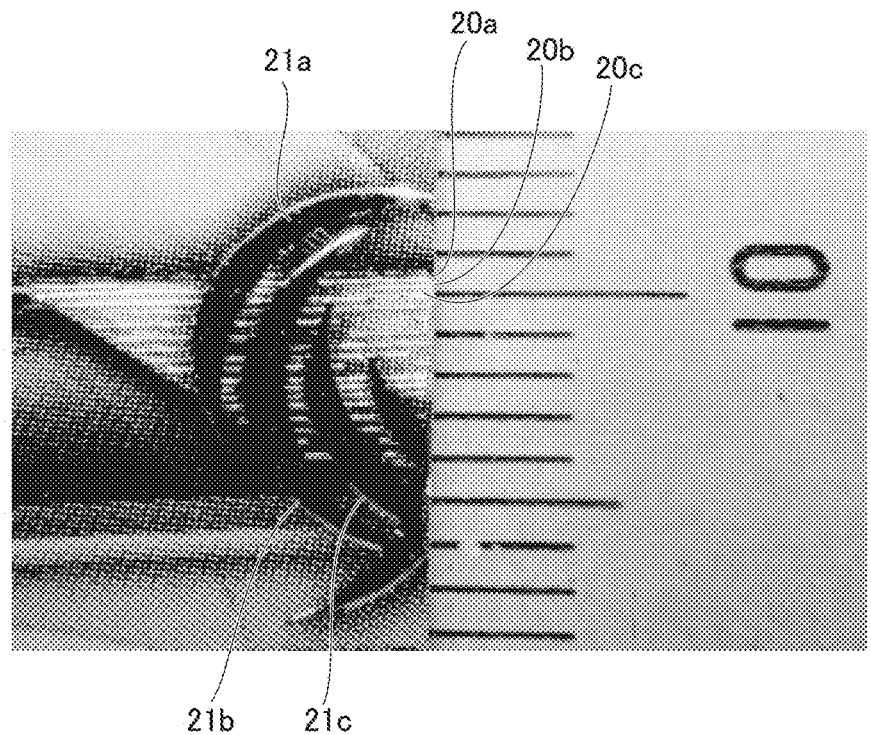
FIG. 4 is an enlarged photograph showing the surface of the card formed by the decoration method according to the embodiment of this disclosure.
Figure 5:
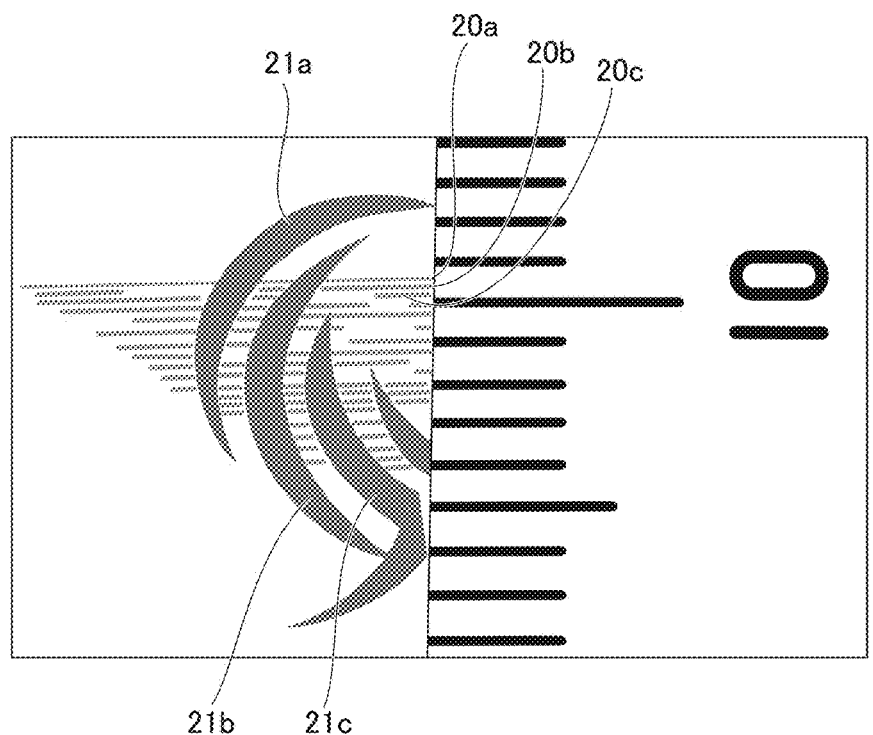
FIG. 5 is an explanation view showing a decoration part of the photograph of FIG. 4.

FIG. 4 is a photograph enlarging the surface of the printed matter (i.e., a card) produced by the above-described method. FIG. 5 is an explanation view showing the pattern of the metal foil portion shown in the photograph of FIG. 4. The pattern of the metal foil portion includes dozens of thin lines 20 (20a, 20b, 20c, . . . ) and crescent-shaped pattern 21 (21a, 21b, 21c, . . . ) formed by the metal foil on the surface of the card. These thin lines 20 and pattern 21 formed by the metal foil are provided by adhering the metal foil onto the convex layer formed by the silk-screen print.

The convex layer may be configured as a high-definition irregular pattern, in which the gap between a convex part and a next convex part (i.e., a width of a concave part) is narrow and the line width formed by each convex part is narrow. When the metal foil is adhered onto such a convex layer, a high-definition pattern is obtained by the metal foil adhered on the convex layer. Since the convex layer is formed by the rising of the viscous ink, the outer edges of the surface of the convex parts have rounded shapes. Therefore, when the metal foil is pressed onto the convex layer, depending on the pressure applied on the metal foil, the metal foil is attached to the convex layer along the rounded shapes of the outer edges. That is, the metal foil is attached to not only the uppermost surfaces (points) of the convex layer but the surrounding parts of the uppermost surfaces. As a result, even when the top part of the convex layer has a very thin line-shape, the outline can give a three-dimensional appearance.

As is understandable from the scale of the drawing, the card has four or five thin lines 20 within a width of 1 mm. The thin lines 20 represent the metal foil attached to the upper surfaces of the convex layer formed by the silk-screen print. As described above, with the method according to this embodiment, it is possible to form the high-definition pattern with the metal foil in the three-dimensional manner.

In the conventional hot-stamp method, it is not possible to make the foil part three-dimensional since the foil part itself is pressed by a convex pattern. Further, in the conventional cold-stamp method, the metal foil is adhered onto a flat surface. Hence, the pattern obtained by the cold-stamping is relatively flat. Further, since the outlines of the foil part are formed by the boarders between adhesive parts and non-adhesive parts, the edges may not sufficiently be clear. In contrary, the method of the embodiment can achieve a three-dimensional and high-definition pattern with the metal foil.

The above described decoration method and the printed matter include: providing a peeling layer and a convex layer on a surface of the printed matter (i.e., the base), and not adhering a metal foil on the peeling layer while adhering the metal foil on the convex layer so as to decorate the surface of the printed matter.

Further, the printed matter produced by the above method may further include a peeling layer of peeling varnish on the surface of the printed matter, and the surface of the peeling layer may be decorated by the metal foil adhered to the convex layer. That is, the card may be provided with a plurality of the decorative layer including the peeling layer, the convex layer, and the metal foil. Here, different colors may be applied to the metal foils. For example, it is possible to attach a gold-colored metal foil after attaching a silver-colored metal foil in accordance with the method of this disclosure. In other words, the decoration method of a printed matter and the printed matter according to this disclosure may include a plurality of metal foils in the decorative layer.

With the decoration method of the printed matter according to this disclosure, it is possible to form the metal foil provided on the surface to be a high-definition and three-dimensional pattern. Further, the printed matter according to this disclosure has a high-definition and three-dimensional pattern with the metal foil. The high-definition pattern gives an impression of high quality. Also, as the metal foil part provided in the wide area looks thick, it gives luxurious feeling.

Although the present invention has been described in terms of exemplary embodiments, it should not be limited thereto. It should be appreciated that variations or modifications may be made in the embodiments described by persons skilled in the art without departing from the scope of the present invention as defined by the following claims.

INDUSTRIAL APPLICABILITY

This disclosure may be applied not only to a decoration of cards but also to a variety of types of printed matters such as a leaflet, a pamphlet, a magazine, and a calendar.

What is claimed is:

1. A decoration method of a printed matter, comprising:
forming a coated film by applying transparent varnish on a surface of a sheet or on a surface of a mounting paper, the sheet or the mounting paper comprising the printed matter;
printing a predetermined pattern on the surface of the coated film by an ink or by a resin which are capable of being adhered to the coated film;
pressing a metal foil onto the pattern printed by the ink or the resin with an adhesive agent, the adhesive agent having a property in which the adhesive agent does not adhere to the coated film but adheres to the pattern printed by the ink or the resin; and
adhering the metal foil only to the pattern printed by the ink or the resin,
wherein the transparent varnish contains nitrocellulose as a resin component.

2. A decoration method of a printed matter, comprising:
forming a coated film by applying transparent varnish on a surface of a sheet or on a surface of a mounting paper, the sheet or the mounting paper is applied with an offset printing;
printing a predetermined pattern on the surface of the coated film by an ink or by a resin which are capable of being adhered to the coated film;
pressing a metal foil onto the pattern printed by the ink or the resin with an adhesive agent, the adhesive agent having a property in which the adhesive agent does not adhere to the coated film but adheres to the pattern printed by the ink or the resin; and
adhering the metal foil only to the pattern printed by the ink or the resin,
wherein the transparent varnish contains nitrocellulose as a resin component.

3. A decoration method of a printed matter, comprising:
forming a coated film by applying transparent varnish on a surface of a sheet or on a surface of a mounting paper, the sheet or the mounting paper is applied with an offset printing and with a hologram, the hologram comprising a pattern by reflecting light;
printing a predetermined pattern on the surface of the coated film by an ink or by a resin which are capable of being adhered to the coated film;
pressing a metal foil onto the pattern printed by the ink or the resin with an adhesive agent, the adhesive agent having a property in which the adhesive agent does not adhere to the coated film but adheres to the pattern printed by the ink or the resin; and
adhering the metal foil only to the pattern printed by the ink or the resin,
wherein the transparent varnish contains nitrocellulose as a resin component.

4. The decoration method according to claim 1, wherein the card has a substantially rectangular shape and is holdable by a hand.

5. A printed matter, comprising:
a sheet or a mounting paper;
a coated film of a transparent varnish that is provided on a surface of the sheet or of the mounting paper;
a pattern that is formed by an ink or by a resin which are capable of being adhered to the coated film; and
a metal foil that is provided only on a surface of the pattern using an adhesive agent, the adhesive agent having a property in which the adhesive agent does not adhere to the coated film but adheres to the pattern formed by the ink or the resin,
wherein the transparent varnish contains nitrocellulose as a resin component.

6. The printed matter according to claim 5, wherein the mounting paper has a substantially rectangular shape and is holdable by a hand.

* * * * *